(12) United States Patent
Limowa

(10) Patent No.: US 12,552,086 B2
(45) Date of Patent: Feb. 17, 2026

(54) MATERIAL PROCESSING METHOD AND MOLDING MACHINE

(71) Applicant: Versa 3 Technology Co., Ltd., Mahe (SC)

(72) Inventor: Erwin Limowa, Mahe (SC)

(73) Assignee: VERSA 3 TECHNOLOGY CO., LTD., Mahe (SC)

( * ) Notice: Subject to any disclaimer, the term of this patent is extended or adjusted under 35 U.S.C. 154(b) by 328 days.

(21) Appl. No.: 18/200,876

(22) Filed: May 23, 2023

(65) Prior Publication Data

US 2024/0316840 A1    Sep. 26, 2024

(30) Foreign Application Priority Data

Mar. 24, 2023   (CN) .......................... 202310300205.0
Mar. 24, 2023   (CN) .......................... 202320602601.4

(51) Int. Cl.
| | |
|---|---|
| *B29C 51/10* | (2006.01) |
| *B29C 49/00* | (2006.01) |
| *B29C 49/08* | (2006.01) |
| *B29C 49/14* | (2006.01) |
| *B29C 49/64* | (2006.01) |
| *B29C 51/00* | (2006.01) |

(Continued)

(52) U.S. Cl.
CPC .......... *B29C 51/10* (2013.01); *B29C 49/0031* (2013.01); *B29C 49/086* (2022.05); *B29C 49/14* (2013.01); *B29C 49/6418* (2013.01); *B29C 51/006* (2013.01); *B29C 51/04* (2013.01); *B29C 51/262* (2013.01); *B29C 51/425* (2013.01)

(58) Field of Classification Search
CPC ....... B29C 49/14; B29C 51/428; B29C 51/10; B29C 51/006; B29C 49/0031; B29C 49/6418–642
See application file for complete search history.

(56) References Cited

U.S. PATENT DOCUMENTS

2018/0001543 A1*  1/2018  Yamasaki ........... B29C 48/0018
2018/0050475 A1    2/2018  Kara et al.
(Continued)

FOREIGN PATENT DOCUMENTS

| CN | 109397669 A | * | 3/2019 | ............ B29C 51/06 |
| CN | 209440769 U | | 9/2019 | |

(Continued)

OTHER PUBLICATIONS

Translation of CN-109397669-A (Year: 2019).*

(Continued)

*Primary Examiner* — John J DeRusso
(74) *Attorney, Agent, or Firm* — Panitch Schwarze Belisario & Nadel LLP

(57) ABSTRACT

A material processing method and a molding machine therefor are described. The molding machine comprises a pressing module, a heating module, and an air supplying module. The method comprises: placing material to be processed within a material molding space of the molding machine, and supplying air to an air passage provided in the material by the air supplying module; heating the material by the heating module according to a preset heating parameter; and pressing the material by the pressing module according to a preset pressing parameter.

16 Claims, 6 Drawing Sheets

(51) Int. Cl.
B29C 51/04 (2006.01)
B29C 51/26 (2006.01)
B29C 51/42 (2006.01)

(56) References Cited

U.S. PATENT DOCUMENTS

2024/0149323 A1\* 5/2024 Yamauchi ............... B30B 13/00
2024/0399645 A1\* 12/2024 Gonnetan ............. B29C 51/265

FOREIGN PATENT DOCUMENTS

| CN | 216032029 U | 3/2022 |
| CN | 116394499 A | 7/2023 |
| CN | 219926709 U | 10/2023 |
| DE | 102020128526 A1 | 5/2022 |
| EP | 0514616 B1 | 1/1998 |

OTHER PUBLICATIONS

Extended European Search Report issued Jan. 23, 2025 in EP Application No. 23875936.9.
International Search Report issued Jan. 4, 2024 in International Application No. PCT/CN2023/131277 (English Translation).
Written Opinion issued Jan. 4, 2024 in International Application No. PCT/CN2023/131277.

\* cited by examiner

MATERIAL PROCESSING METHOD AND MOLDING MACHINE

CROSS-REFERENCE TO RELATED PATENT APPLICATION

This application claims the benefits of and priorities to Chinese Patent Application No. 202310300205.0 filed on Mar. 24, 2023 and Chinese Patent Application No. 202320602601.4 filed on Mar. 24, 2023, the entire disclosures of which are incorporated by reference herein.

TECHNICAL FIELD

The present disclosure relates to the field of material processing technologies, in particular to a material processing method and a molding machine.

BACKGROUND

As one of the secondary processing industrial technologies, the molding processing technology is widely used in various industries such as electronics, electrical appliances, food, hardware tools, cosmetics, daily necessities, pharmaceuticals, health care products, and automobiles.

In practical applications, for example, plastic sheets may be heated and deformed into the required shape and size, thereby achieving the application purpose with the aid of supplementary processes.

However, the existing molding processing technology still has problems of poor molding effects.

SUMMARY

Embodiments of the present disclosure at least provide a material processing method and a molding machine with a better molding effect.

In a first aspect, embodiments of the present disclosure provide a material processing method using a molding machine that includes a pressing module, a heating module, and an air supplying module, the method including:
placing material to be processed within a material molding space of the molding machine, and supplying air to an air passage provided in the material by the air supplying module;
heating the material by the heating module according to a preset heating parameter; and
pressing the material by the pressing module according to a preset pressing parameter.

In a possible embodiment, the molding machine further includes a fixing module, and the method further includes: after placing the material to be processed within the material molding space of the molding machine and before supplying air to the air passage provided in the material by the air supplying module, clamping and fixing the material placed in the material molding space by a clamping component of the fixing module; and after heating the material by the heating module and before pressing the material by the pressing module, stretching the heated material vertically by a straightening component of the fixing module so that the material is in a straightened state.

In a possible embodiment, the molding machine further includes a mold module matched with the pressing module, and pressing the material by the pressing module includes:
heating the mold module, so that a temperature difference between the heated mold module and the heated material is less than a preset threshold; and
driving the heated mold module by the pressing module to press the material.

In a possible embodiment, the heating module includes a heating furnace, and heating the material by the heating module according to the preset heating parameter includes:
activating the heating furnace to heat the material in the heating furnace; and
baking the material at a preset temperature for a first preset duration to acquire the heated material.

In a possible embodiment, the pressing module includes a pressing cylinder, and pressing the material by the pressing module according to the preset pressing parameter includes:
activating the pressing cylinder to press the material by the pressing module by means of either lateral pressing or vertical pressing; and
acquiring a molded material by performing mold closing for a second preset duration with a preset pressure value.

In a second aspect, embodiments of the present disclosure provide a molding machine, which includes a pressing module, a heating module and a material molding space, and further includes an air supplying module, wherein
the material molding space is configured to accommodate material;
the heating module is configured to heat the material;
the pressing module is configured to press the material; and
the air supplying module is configured to supply air via an air passage provided in the material.

In a possible embodiment, the air supplying module includes an air source and at least one air supplying nozzle, where the air source is connected to the at least one air supplying nozzle, and the at least one air supplying nozzle is paired with at least one air passage provided in the material.

In a possible embodiment, the molding machine further includes a retractable component provided in correspondence with the air supplying nozzle, where the retractable component is configured to insert the air supplying nozzle into the corresponding air passage for air supplying when the material is placed inside the material molding space.

In a possible embodiment, the molding machine further includes a fixing module including a clamping component and a straightening component, where
the clamping component is configured to clamp and fix the material placed in the material molding space; and
the straightening component is configured to stretch the heated material vertically so that the material is in a straightened state.

In a possible embodiment, there are two fixing modules provided on upper and lower sides of the molding machine respectively.

In a possible embodiment, the pressing module includes two paired pressing assemblies configured to move towards each other to press both sides of the material respectively.

In a possible embodiment, the pressing assembly includes a hydraulic cylinder, a pressing member and a guide rod, and a mold component is attached to the pressing member;
the hydraulic cylinder is configured to convert hydraulic energy into mechanical energy for moving the pressing member; and
the pressing member is configured to drive the mold component to move along the guide rod to perform mold opening or mold closing, based on the mechanical energy provided by the hydraulic cylinder.

In a possible embodiment, the molding machine further includes a mold module including two mold components, with one pressing assembly provided on an outer side of each of the mold components, where the two mold components are configured to cause the material to be molded according to the mold shape when the two pressing assemblies press the material respectively.

In a possible embodiment, the two pressing assemblies are provided on left and right sides of the molding machine respectively.

In a possible embodiment, the heating module includes a sliding component and a heating component, where the sliding component is configured to drive the heating component to slide into the material molding space; and the heating component is configured to heat the material placed in the material molding space.

In a possible embodiment, a moving direction of the heating module is perpendicular to a moving direction of the pressing module.

According to the material processing method and molding machine, the secondary processing of the material can be completed by cooperation between the pressing module, heating module and air supplying module of the molding machine. During the second processing, the air is continuously supplied by the air supplying module to the air passage provided in the material. Meanwhile, the material is heated according to the preset heating parameter and pressed according to the preset pressing parameter, such that the material as molded by this strict process can avoid abnormal shape changes caused by the secondary processing operation, thus ensuring the improved molding effect.

Other advantages of the present disclosure will be explained in more detail with reference to the following description and accompanying drawings.

It should be understood that the above description is only an overview of the technical solutions of the present disclosure for facilitating understanding of technical means of the present disclosure, so as to enable implementation of the present disclosure in accordance with the content described in the specification. Detailed description of the present disclosure will be given below to make the above and other objects, features, and advantages of the present disclosure more apparent and comprehensible.

BRIEF DESCRIPTION OF THE DRAWINGS

For clearer descriptions of the technical solutions in the embodiments of the present disclosure, the following briefly introduces the accompanying drawings required for describing the embodiments. The drawings herein are incorporated in and constitute a part of the specification, and show the embodiments consistent with the present disclosure and are used together with the specification to explain the technical solutions of the present disclosure. It shall be understood that the accompanying drawings below show merely some embodiments of the present disclosure and thus cannot be deemed as a restriction to the scope, and a person of ordinary skill in the art may still derive other accompanying drawings from these accompanying drawings without creative efforts. Further, a same reference sign is adopted to indicate a same component throughout the accompanying drawings. In the accompanying drawings.

Figure 1:
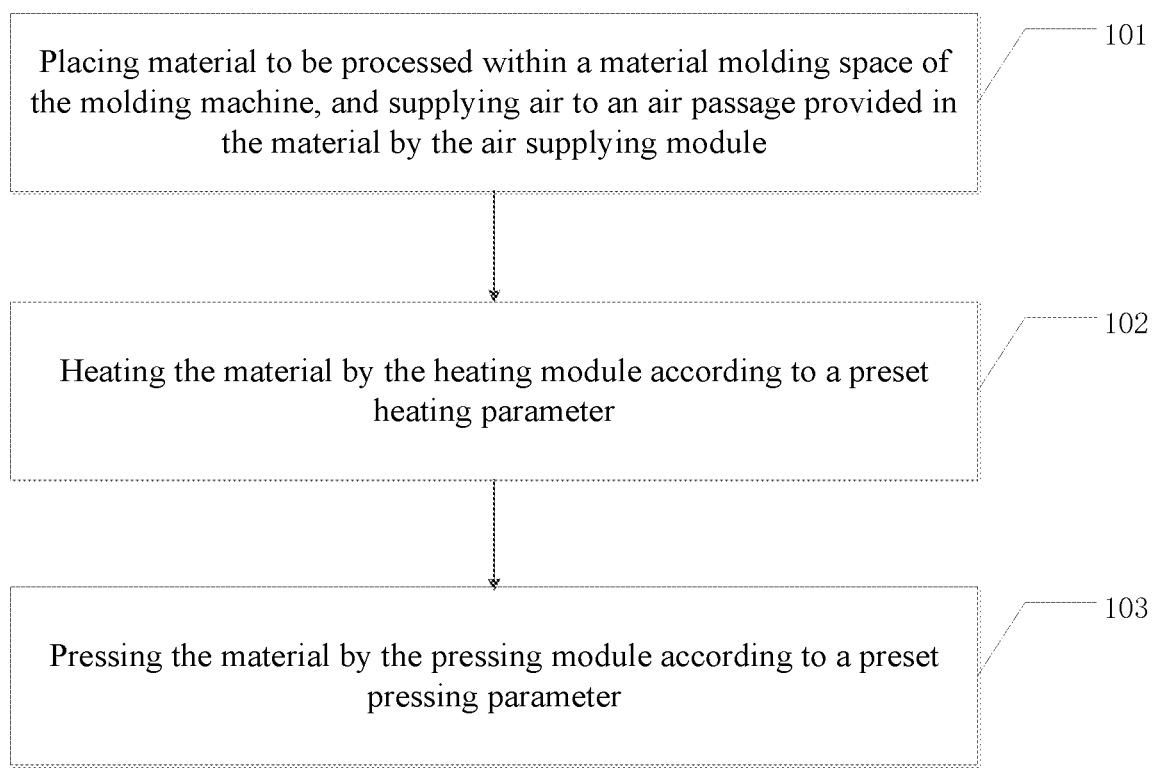
FIG. 1 is a flowchart of a material processing method according to an embodiment of the present disclosure.

| [Reference signs] | |
|---|---|
| 11-Pressing module; | 22-Heating module; |
| 33-Material molding space; | 44-Air supplying module; |
| 55-Mold module; | 66-Fixing module; |
| 111-Pressing assembly; | 221-Sliding component; |
| 222-Heating component; | 551-Mold component; |
| 661-Clamping component; | 662-Straightening component |

DETAILED DESCRIPTION

In order to make the objectives, technical solutions and advantages of embodiments of the present disclosure more clearly, technical solutions of the present disclosure will be described in detail below with reference to accompanying drawings of embodiments of the present disclosure. It is obvious that the described embodiments are only a part of embodiments of the present disclosure, not all embodiments of the present disclosure. Generally, the components according to embodiments of the present disclosure which are described and illustrated in accompanying drawings herein may be arranged and designed in a variety of different configurations. Accordingly, the following detailed description of embodiments of the present disclosure according to the accompanying drawings is not intended to limit the protection scope of the present disclosure as claimed, but merely indicates certain embodiments of the present disclosure. All the other embodiments achieved by those skilled in the art based on the embodiments of the present disclosure without creative effort should also fall within the protection scope of the present disclosure.

It should be noted that similar numerals and letters denote similar elements in the accompanying drawings below, so that once an element is defined in one accompanying drawing, it does not need to be further defined and explained in the subsequent accompanying drawings.

In the description of the present disclosure, it should be understood that, orientation or position relationships indicated by the terms "center", "upper", "lower", "left", "right", "vertical", "horizontal", "inner", "outer", and the like are based on the orientation or position relationships as shown in the drawings or are orientation or position relationships when the product of the present disclosure is customarily placed in use, for ease of the description of the present disclosure and simplifying the description only, rather than indicating or implying that the indicated device or element must have a particular orientation or be constructed and operated in a particular orientation. Therefore, these terms should not be understood as a limitation to the present disclosure. Furthermore, the terms such as "first", "second", "third" and the like are merely for a distinguishing purpose, and cannot be understood as indicating or implying a relative importance.

In the description of the present disclosure, it should be understood that, unless otherwise specified and defined, the terms "provide", install", "connect", "couple" should be comprehended in a broad sense, and may be comprehended as, for example, fixed or detachable connection, or integrated connection; a mechanical or electrical connection a direct connection or an indirect connection through an intermediate medium; or a communication between interiors of two elements. The specific meanings of the above terms in the present disclosure may be understood by those skilled in the art according to specific context.

It is known that there are various molding processing techniques in the related art, such as the plastic molding technology which is a plastic sheet thermoforming processing technology. By using the plastic molding technology, plastic sheets may be heated and deformed into the required shape and size with molds and pressures, thereby achieving the application purpose with the aid of supplementary processes.

However, the existing plastic molding technology often suffers from the phenomenon that edges of plastic sheets partially fails to be attached and fitted on the mold, which easily causes warping after molding, thus resulting in degraded molding effect.

In order to solve, at least in part, one or more of the problems and other potential problems, the present disclosure provides a material processing method and a molding machine to achieve a better molding effect through operations such as heating, pressing and air supplying in combination.

To facilitate the understanding of embodiments of the present embodiment, a material processing method claimed by embodiments of the present disclosure is firstly described in detail. The processing method utilizes a molding machine for processing the material, and the molding machine herein includes a pressing module, a heating module and an air supplying module. Referring to FIG. 1 that is a flowchart of a material processing method according to an embodiment of the present disclosure, the processing method includes steps S101 to S103.

S101: material to be processed is placed in a material molding space of the molding machine, and air is supplied by the air supplying module to an air passage provided in the material.

S102: the material is heated by the heating module according to a preset heating parameter.

S103: the material is pressed by the pressing module according to a preset pressing parameter.

In order to facilitate further understanding of the material processing method according to embodiments of the present disclosure, the application scenario of the processing method will be detailed first. Embodiments of the present disclosure may be applied in the field of material processing technology, where the material can be any material that needs to be molded by secondary processing, and may for example be a sheet of plastic material or for example be a tube material of acrylic material, and the like.

In an implementation, the method can be applied in various industries including electronics, electrical appliances, food, hardware tools, cosmetics, daily necessities, pharmaceuticals, health care products, automobiles and other industries. Considering the widespread application of automotive batteries, the material here may be a tube material for dissipating heat from the battery, and this application is also taken as an example in the following.

Considering that the shape of the tube material required for different battery models is not the same, the original material herein may be shaped by the material processing method according to the embodiments of the present disclosure to obtain a molded material having a larger area to fit the battery.

In the process of molding the material with the molding machine, the material to be processed is first placed in the material molding space. For the material placed in the material molding space, operations including the heating operation of the heating module, the pressing operation of the pressing module, and the air supplying operation of the air supplying module can be carried out thereon, and the operations are executed in a certain order, so that the molded material has a better molding effect.

The heating operation here is adopted to soften the material, because the softened material is more conducive to the subsequent pressing and molding. The pressing operation here is adopted to mold the softened material into a specific shape by a mold.

Different heating parameters may be set for different materials. For example, for materials having rather high hardness, a longer heating duration and a higher heating temperature may be set, which is not specifically limited by embodiments of the present disclosure.

In an implementation, the required heating duration and temperature should not be too long/high or too short/low. A too long duration or too high temperature may easily lead to being out of shape due to heating, and a too short duration or too low temperature may lead to failing to achieve a good molding effect. In embodiments of the present disclosure, the heating parameters for the current material to be processed can be determined by multiple heating tests, and may for example be set as a heating temperature of 115° and a heating duration of 30 seconds.

In addition, the specific form of the heating module of embodiments of the present disclosure is not limited, and the heating module may for example be a heating furnace. The heating furnace may be activated to have the material heated therein and baked for 30 seconds to obtain the heated material.

The material processing method according to embodiments of the present disclosure can apply a specific pressure to the material by a pressing module when it is determined that the pressing is required. Similarly, different pressing parameters may also be set for different materials, and for materials having a rather high hardness, a greater pressure value may be set, which is not specifically limited by embodiments of the present disclosure.

In an implementation, the pressure value as required should not be too large or too small. A too large value may easily lead to being out of shape due to pressing, and a too small value may lead to failing to achieve a good molding effect. In embodiments of the present disclosure, the pressing parameters for the current material to be processed can be determined by multiple pressing tests, and may for example be set as a pressure range of 50-80 tons and a pressing duration of 2 seconds to achieve a fast molding.

In addition, the specific form of the pressing module of embodiments of the present disclosure is not limited, and may for example be a pressing cylinder. The pressing cylinder may be activated to have the material pressed thereby, and the molded material can be acquired by mold closing for 2 seconds.

It should be noted that the pressing herein includes, but is not limited to, lateral pressing and vertical pressing. In the specific application process, the manner of pressing may be selectively determined in consideration of processing needs for different materials, which is not specifically limited herein.

In order to further enhance the molding effect, the air may be supplied by the air supplying module to the air passage provided in the material no matter in the process of heating operation or pressing operation, and the air passage may well support the molding effect for the material with continuous air supplying.

It should be noted that in the actual usage of the molding machine, the operations related to heating, pressing, air supplying and the like can be performed automatically in sequence, which means that, after placing the material in the material molding space, the whole processing method can be executed according to the preset workflow by pressing just one button for executing the operations. Alternatively, the method may be executed manually, after the completion of each operation node, by the staff who has confirmed the processing effect of the current process, which may for example be applied for the debugging stage. In addition, the method may be executed in other ways, which is not specifically limited herein.

For the material placed in the material molding space, the fixing module provided in the molding machine may be adopted in embodiments of the present disclosure to assist the operations, in order to facilitate execution of the processing method.

On one hand, the material placed in the material molding space can be clamped and thus fixed by the clamping component of the fixing module. For the material in the fixed state, the air can be supplied more easily by the air supplying module, because the clamping component forms a relatively closed space with the material, thereby facilitating the air supplying of the air supplying module.

In an implementation, the air supplying module may be fixedly provided on the fixing module, to facilitate the determination of the air supplying operation by the air supplying module following the clamping operation.

On the other hand, after the heating module heats the material in the fixed state, the softened material is difficult to be pressed and shaped subsequently. Based on this, the fixing module of the present disclosure may also be provided with a straightening component to stretch the heated material vertically to make it in a straightened state, thereby facilitating the subsequent molding.

In order to further ensure the molding effect, the mold module matched with the pressing module may be preheated here, with the temperature difference between the heated mold module and the heated material being less than a preset threshold. In other words, it is necessary to ensure that the temperature difference between the mold module and the material is small enough, because the rapid cooling of the material that comes into contact with the outside air after the heating module stops working or withdraws from the material molding space is not conducive to the subsequent molding. In order to meet the subsequent molding effect, the mold module may be heated according to the temperature comparable to the heating temperature, so that the molding effect can be ensured by the pressing module driving the heated mold module to press the material.

For example, in case that the heating temperature is set as 115 degrees, a mold temperature controller can be turned on to heat the mold module to the required 120 degrees.

In order to further illustrate the cooperative workflow of the aforesaid modules, the specific structure of the molding machine according to embodiments of the present disclosure will be explained below.

The molding machine according to embodiments of the present disclosure includes a pressing module, a heating module, a material molding space and an air supplying module, wherein the material molding space is configured to accommodate material;

the heating module is configured to heat the material;

the pressing module is configured to press the material; and the air supplying module is configured to supply air via an air passage provided in the material.

In the molding machine according to embodiments of the present disclosure, the secondary processing of the material can be completed by cooperation between the pressing module, heating module, material molding space and air supplying module. The pressing module herein is configured to press the material, and the heating module is configured to heat the material. Meanwhile, the air supplying module can supply air via the air passage provided in the material. As well known, no matter in the pressing stage or heating stage, the air supplying operation to the air passage as performed by the air supplying module can avoid the abnormal shape changes caused by the secondary processing operation and ensure the improved molding effect.

The pressing module here may be any related module capable of pressing the material. In an implementation, the pressing module may work in cooperation with the mold module, which means that the pressing module can drive the mold module to perform mold opening or closing on the material. The pressing may be in a lateral direction, in a vertical direction, or in other directions. The corresponding pressing module can be determined here in consideration of different materials and mold modules, which is not specifically limited herein.

The heating module here may be any related module capable of heating the material. In an implementation, the heating module can reach to the material for heating; that is, the material does not move, but the heating module moves. In addition, the material may also move to the heating module for heating; that is, the heating module does not move, but the material moves.

The air supplying module here may be any related module capable of supplying air to the air passage provided in the material, and may generally supply the air.

In order to facilitate further understanding of the molding machine according to embodiments of the present disclosure, each embodiment will be described in detail below with reference to FIGS. 2 to 7.

Embodiment 1

Embodiment 1 of the present disclosure provides a molding machine, which includes a pressing module 11, a heating module 22, a material molding space 33, and an air supplying module 44.

In order to ensure the heating effect at the first stage and the pressing effect at the later stage, the moving direction of the heating module 22 and the moving direction of the pressing module 11 are configured to be different, and may for example be vertical to each other. With reference to the first side view of the molding machine shown in FIG. 3 and the second side view of the molding machine shown in FIG. 4, the vertical arrangement between the two directions can be clearly seen, which can further ensure the compactness of the molding machine while ensuring the heating and pressing effect.

Embodiment 2

Embodiment 2 of the present disclosure provides a molding machine, which includes a pressing module 11, a heating module 22, a material molding space 33, and an air supplying module 44.

The pressing module 11 therein includes two pressing assemblies 111 that are paired with each other, and the two pressing assemblies 111 are configured to move towards each other to press both sides of the material respectively.

Figure 2:
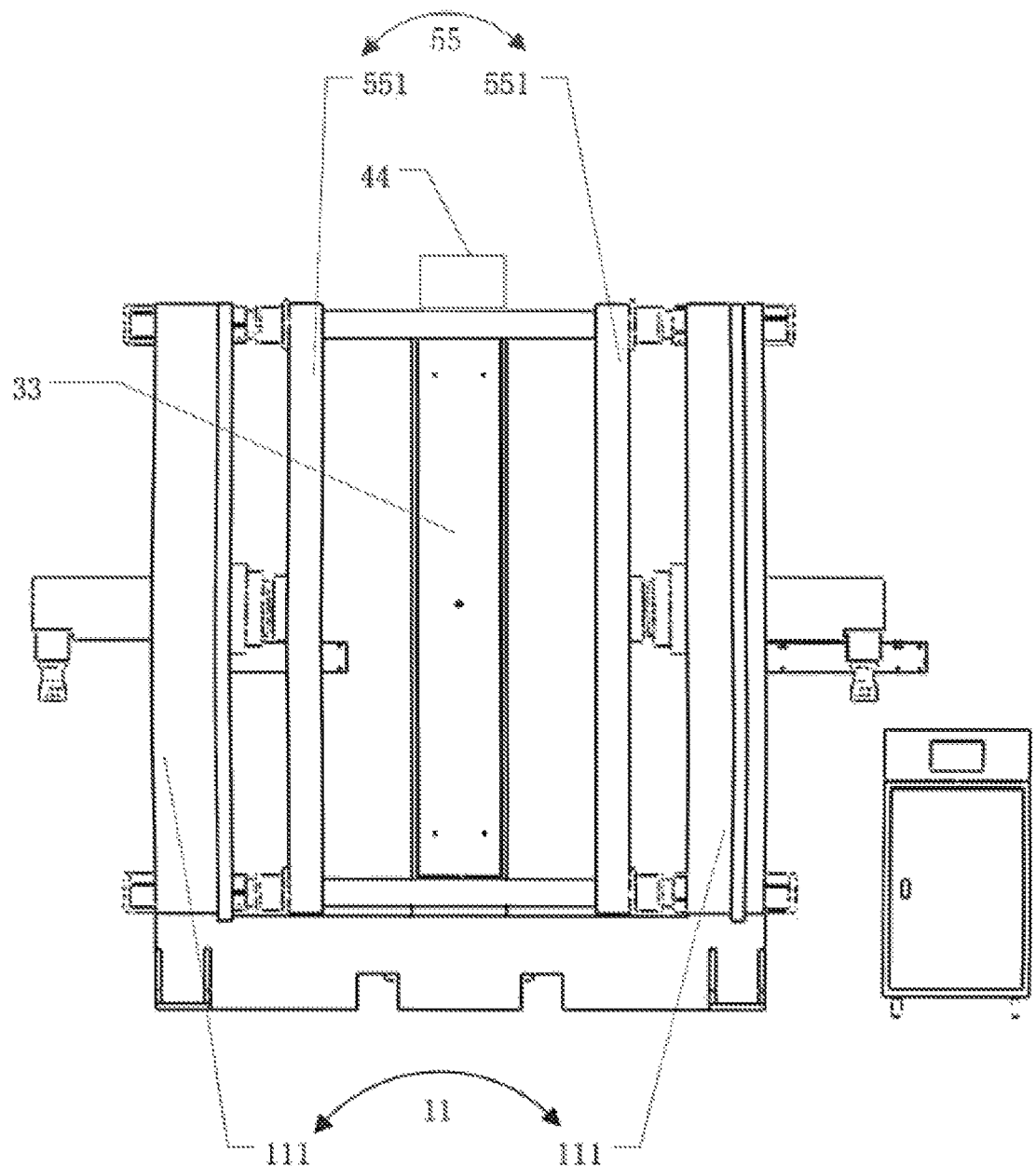
FIG. 2 is a front view of a molding machine according to an embodiment of the present disclosure.
Figure 3:
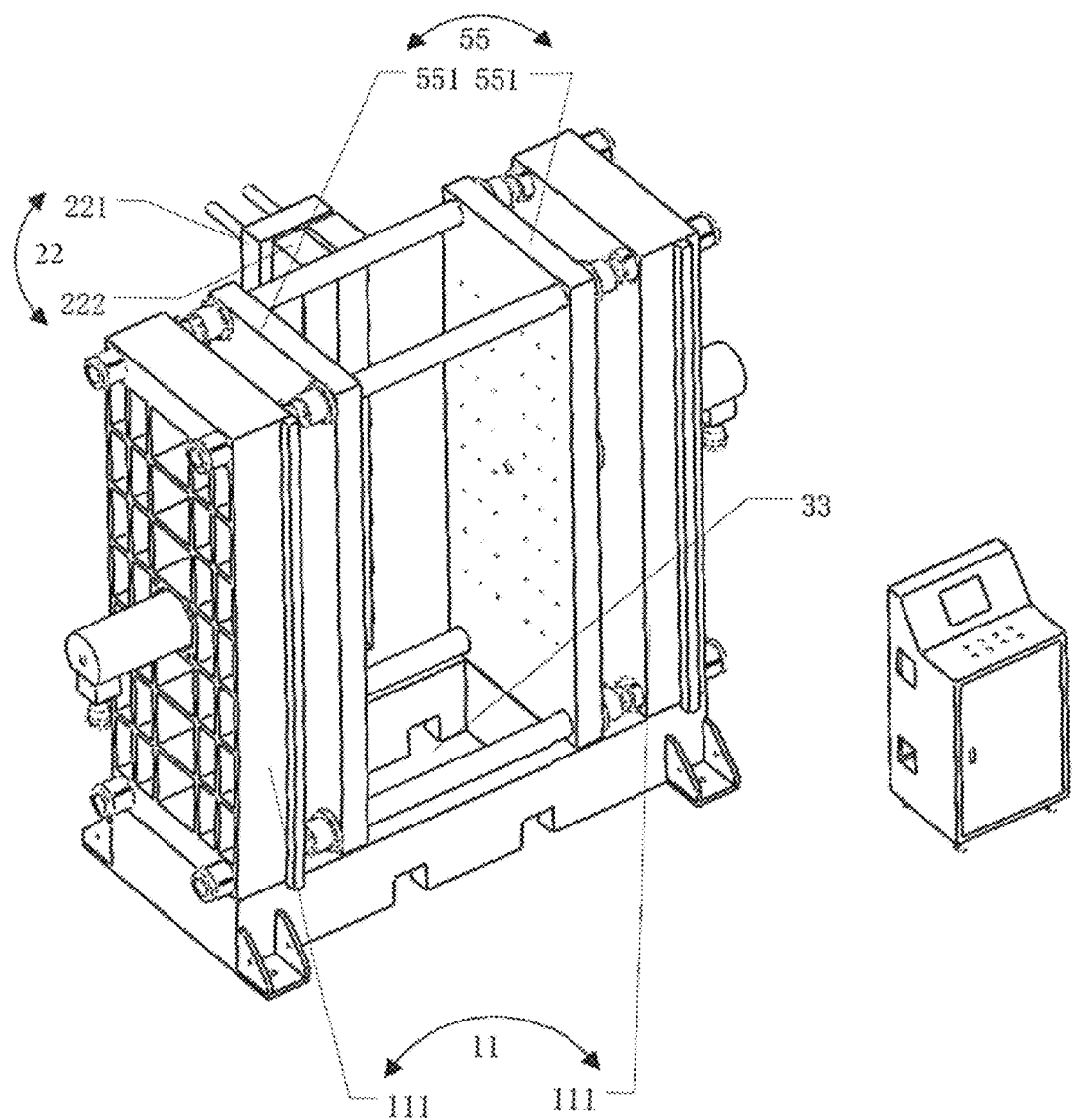
FIG. 3 is a first side view of a molding machine according to an embodiment of the present disclosure in a first perspective view.
Figure 4:
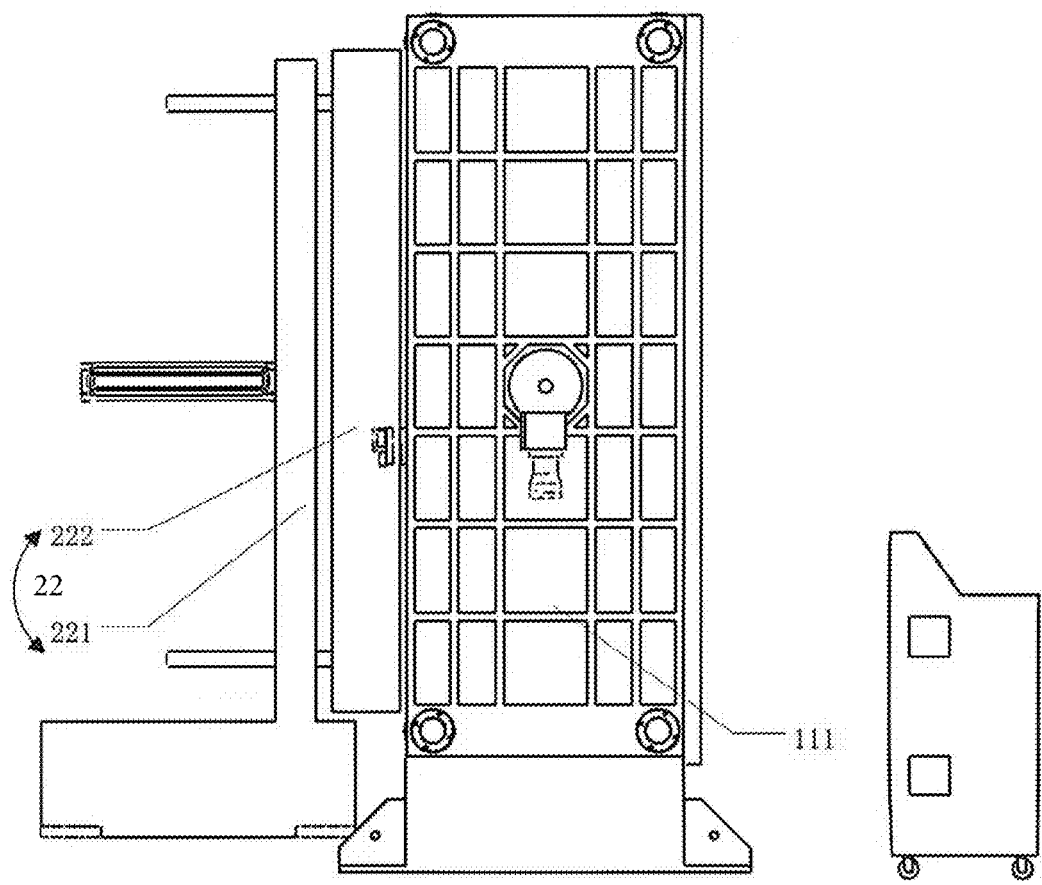
FIG. 4 is a second side view of a molding machine according to an embodiment of the present disclosure in a second perspective view.
Figure 5:
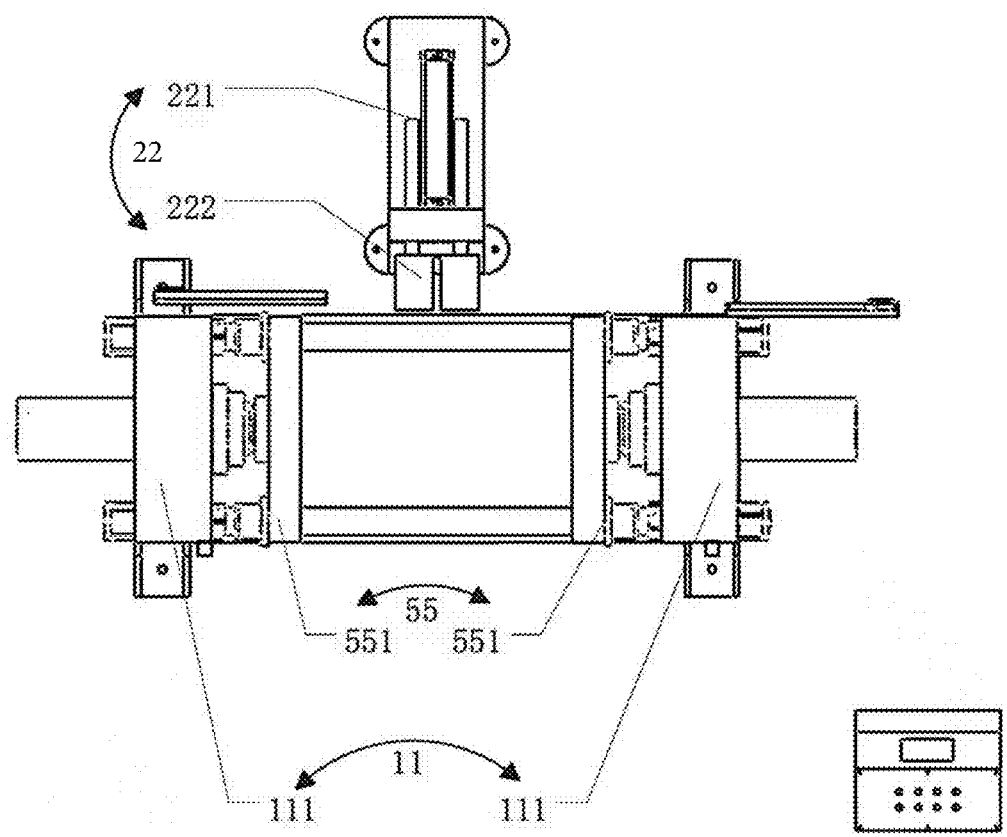
FIG. 5 is a top view of a molding machine according to an embodiment of the present disclosure.

Referring to the front view of the molding machine shown in FIG. 2 and the top view of the molding machine shown in FIG. 5, it can be seen that the two pressing assemblies 111 are symmetrically provided on the left and right sides of the molding machine and can perform the pressing operation on the material placed in the material molding space 33 from two directions. In other words, one pressing assembly 111 provided on the left side moves to the right to press the left side of the material, and the other pressing assembly 111 on the right side moves to the left to press the right side of the material.

Different pressing parameters may be set for different materials. For the specific settings of the pressing operation, the relevant descriptions in the aforementioned processing method may be referred to, which will not be repeated here.

In an implementation, a mold component 551 is provided on an inner side of each pressing assembly 111. In this way, when both of the two pressing assemblies 111 press the material, they can drive the respective mold components 551 to mold the material according to the shape of the mold.

The mold component 551 may be configured with different mold shapes as actually desired, and in an implementation, the molding requires a mold module 55 that has two mold components 551 work together.

The pressing assembly 111 in this embodiment of the present disclosure may adopt any pressing method capable of driving the mold component 551 to open or close the mold, and may for example adopt the hydraulic pressing method or other pressing methods, which is not specifically limited herein.

Taking the hydraulic pressing method as an example, the pressing assembly 111 here may include a hydraulic cylinder, a pressing member and a guide rod. The hydraulic cylinder is configured to convert hydraulic energy into mechanical energy for moving the pressing member, and the pressing member is configured to drive the mold component 551 to perform mold opening or mold closing by being guided along the guide rod based on the mechanical energy provided by the hydraulic cylinder.

Embodiment 3

Embodiment 3 of the present disclosure provides a molding machine, which includes a pressing module 11, a heating module 22, a material molding space 33, and an air supplying module 44.

The heating module 22 includes a sliding component 221 and a heating component 222. The sliding component 221 is configured to drive the heating component 222 to slide to the material molding space 33, and the heating component 222 is configured to heat the material placed in the material molding space 33.

In an implementation, the heating component 222 may be driven to slide into the material molding space 33 by the sliding component 221, and sufficiently heat the material placed in the material molding space 33. As shown in the first side view of the molding machine in FIG. 3, it is clear that the heating component 222 includes a plurality of side surfaces that are able to surround the material for heating in case the heating component 222 slides into the material molding space 33 where the material is located, thus ensuring the heating effect.

In an implementation, it is possible to control not only the movement of the sliding component 221, but also the opening and closing of a hinged door of the heating component 222. For example, in case the heating is required, the sliding component 221 is configured to slide to the material, and the hinged door is closed to start heating with the material completely surrounded. When the heating is completed, the hinged door is opened and exits the material molding space 33 through the sliding component 221, thereby further ensuring the heating effect.

Different heating parameters may be set for different materials. For the specific settings of the heating operation, the relevant descriptions in the aforementioned processing methods may be referred to, which will not be repeated here.

Embodiment 4

Embodiment 4 of the present disclosure provides a molding machine, which includes a pressing module 11, a heating module 22, a material molding space 33, and an air supplying module 44.

The air supplying module 44 herein includes an air source and at least one air supplying nozzle, the air source being connected to the at least one air supplying nozzle.

The at least one air supplying nozzle is paired with at least one air passage provided in the material, thereby enabling to supply air continuously.

The air source here may be an air pump, which can continuously supply air through the air supplying nozzle.

In an implementation, a corresponding retractable component can be provided for the air supplying nozzle. In this way, when material is present in the material molding space 33, the air supplying nozzle can be inserted into the corresponding air passage for the air supplying, which ensures that the air passage is unobstructed even after the secondary processing of heating, pressing and the like, thereby further ensuring the application needs of the application equipment such as automotive batteries to be used.

Figure 6:
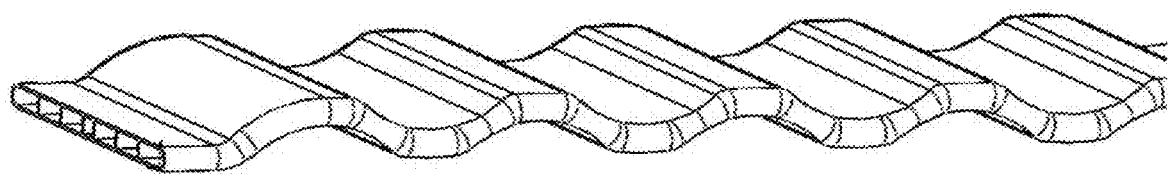
FIG. 6 is an effect diagram of material processing of a molding machine according to an embodiment of the present disclosure.

FIG. 6 shows an example of the molding effect. The apparatus with the molded material applied thereto can be continuously cooled by circulating a liquid such as coolant into the molded material.

Embodiment 5

Embodiment 5 of the present disclosure provides a molding machine, which includes a pressing module 11, a heating module 22, a material molding space 33, and an air supplying module 44.

Figure 7:
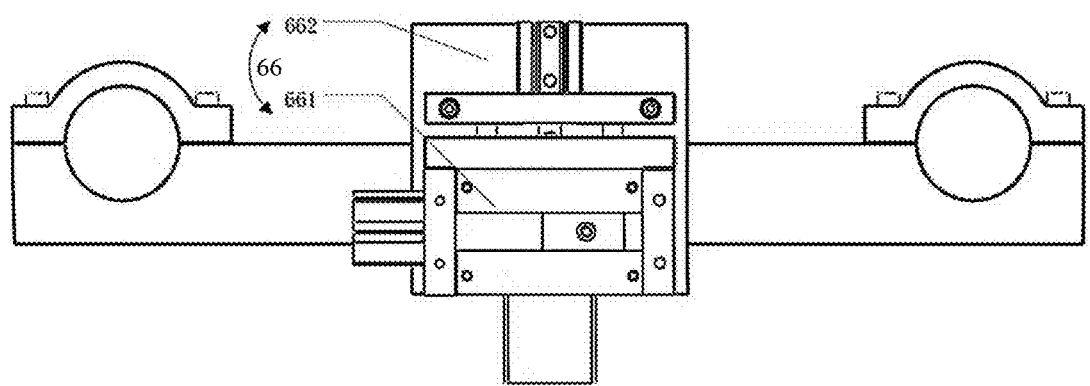
FIG. 7 is a schematic structural diagram of a fixing module of a molding machine according to an embodiment of the present disclosure.

In addition to this, the molding machine further includes a fixing module 66, and the fixing molding includes a clamping component 661 and a straightening component 662, as shown in FIG. 7.

The clamping component 661 herein is configured to clamp and fix the material placed in the material molding space, and the straightening component 662 is configured to stretch the heated material vertically to make the material in a straightened state.

Although the clamping component 661 and the straightening component 662 here are configured for different functions, they may be implemented by the identical or similar cylinder mechanics as actually desired. For example, one side of the clamping component 661 may abut against the material placed vertically, and the other side thereof may clamp the material due to the movement of a piston in the cylinder of the clamping component 661, which corresponds to the lateral movement. Likewise, the straightening component 662 may stretch the material in the vertical direction due to the movement of a piston in the cylinder of the straightening component 662, which corresponds to the longitudinal movement.

In the fixing module 66 as shown in FIG. 7, the clamping component 661 may clamp the material from the left side, while the straightening component 662 may perform vertical stretching on the material to put the material in a straightened state.

There are two fixing modules 66 in embodiments of the present disclosure. The two fixing modules 66 are provided on the upper and lower sides of the molding machine, and the clamping component 661 and the straightening component 662 of the fixing module 66 located on the upper side can respectively clamp the material before the air supplying and straighten the material after heating. Similarly, the clamping component 661 and the straightening component 662 of the fixing module 66 at lower side can respectively clamp the material before the air supplying and straighten the material after heating. The two fixing modules 66 cooperate with each other, so as to stabilize the state of the material and hence facilitate the subsequent pressing and molding.

Embodiment 6

Embodiment 6 of the present disclosure provides a molding machine, which includes a pressing module 11, a heating module 22, a material molding space 33, and an air supplying module 44.

In an embodiment, the molding machines can be variously sized as actually desired. For example, the size of the molding machine may be 2220 mm×1240 mm×2585 mm, which is not specifically limited herein.

In the description of this specification, the description with reference to terms such as "some possible embodiment", "some embodiments", "examples", "specific examples", or "some examples", and the like indicates that the specific feature, structure, material or characteristic described with reference to the embodiment or example is included in at least one embodiment or example of the present disclosure. In this specification, the schematic representations of the aforesaid terms do not necessarily for the same embodiment or example. Moreover, the specific features, structures, materials or characteristics as described may be combined in any one or more embodiments or examples in a suitable manner. In addition, those skilled in the art may combine and group the different embodiments or examples and the features of the different embodiments or examples described in this specification without contradicting each other.

With respect to the flowchart of the method according to embodiments of the present disclosure, certain operations are depicted as different steps performed in a certain sequence, and such a flowchart is illustrative rather than restrictive. Some of the steps described herein may be grouped together and performed in a single operation, some steps may be split into a plurality of sub-steps, and some steps may be performed in an order different from that shown herein. All the steps shown in the flowchart may be implemented in any manner by any circuit structure and/or tangible mechanism (e.g., by software running on a computer device, hardware such as logic functions implemented by a processor, chip and the like, and/or any combination thereof).

It will be understood by those skilled in the art that, in the method according to an embodiment, the sequence of the steps as presented does not imply a strict executing sequence and thereby does not constitute a restriction to the implementing process, and the specific executing sequence of the steps shall be determined by their function and possible internal logic.

One skilled in the art should understand that, the embodiments of the present disclosure may be provided as a method, device (apparatus or system) and computer-readable storage medium. Therefore, the present disclosure may be in the form of full hardware embodiments, full software embodiments, or a combination thereof. Moreover, the present disclosure may be in the form of a computer-readable storage medium that is implemented on one or more computer-usable storage media (including, but not limited to, magnetic disk storage, CD-ROM and optical storage) containing computer-usable program codes.

The present disclosure is described referring to the flowchart and/or block diagram of the method, device (apparatus or system) and computer-readable storage medium according to the embodiments of the present disclosure. It should be understood that, each flow and/or block in the flowchart and/or block diagram and the combination of flow and/or block in the flowchart and/or block diagram may be realized by computer program instructions. Such computer program instructions may be provided to the processor of a general-purpose computer, special-purpose computer, a built-in processor or other programmable data processing devices to produce a machine, such that the instructions executed by the processor of a computer or other programmable data processing devices may produce a device for realizing the functions specified in one or more flows in the flowchart and/or one or more blocks in the block diagram.

Such computer program instructions may also be stored in a computer-readable storage that can guide a computer or other programmable data processing devices to work in a specific mode, such that the instructions stored in the computer-readable storage may produce a manufacture including a commander device, where the commander device may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices may provide a process for realizing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can achieve the information storage by any method or technology. The information may be computer-readable instructions, data structures, program modules, or other data. Examples of the computer storage medium include, but are not limited to, a phase change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be configured to store information that can be accessed by computing devices. Furthermore, although the operations of the method of the present application are described in a specific order in drawings, it does not require or imply that the operations must be performed in the specific order, or that the desired result can only be achieved if all the operations as shown are performed. Additionally or alternatively, some steps may be omitted, multiple steps may be combined into one step for execution, and/or one step may be decomposed into multiple steps for execution.

It shall be noted at last that the aforesaid embodiments are only specific embodiments of the present disclosure to illustrate, instead of limiting, the technical solutions of the present disclosure, and the protection scope of the present disclosure is not limited thereto. Although the present disclosure has been described in detail with reference to the foregoing embodiments, those of ordinary skill in the art shall be understood that: anyone familiar with the art can still modify or envisage changes in the technical solution as described in the aforesaid embodiments, or replace some of them with the same technical features within the technical scope disclosed in the present disclosure. In addition, these modifications, changes or replacements do not deviate from the spirit and scope of the technical solutions of the embodiments of the present disclosure in the essence of the corresponding technical solutions, and should be included within the protection scope of the present disclosure. Therefore, the protection scope of the present disclosure shall be subject to the protection scope defined by the claims.

What is claimed is:

1. A material processing method using a molding machine that comprises a pressing module, a heating module, and an air supplying module, the method comprising:
   placing material to be processed within a material molding space of the molding machine, and supplying air to an air passage provided in the material by the air supplying module;
   heating the material by the heating module according to a preset heating parameter; and
   pressing the material by the pressing module according to a preset pressing parameter, wherein the supplying of air to the air passage is continued during the heating and the pressing.

2. The material processing method according to claim 1, wherein the molding machine further comprises a fixing module; and the material processing method further comprises:
   clamping and fixing the material placed in the material molding space, by a clamping component of the fixing module, after placing the material to be processed within the material molding space of the molding machine and before supplying air to the air passage provided in the material by the air supplying module; and
   after heating the material by the heating module and before pressing the material by the pressing module, stretching the heated material vertically by a straightening component of the fixing module so that the material is in a straightened state.

3. The material processing method according to claim 1, wherein the molding machine further comprises a mold module matched with the pressing module, and pressing the material by the pressing module comprises:
   heating the mold module, so that a temperature difference between the heated mold module and the heated material is less than a preset threshold; and
   driving the heated mold module by the pressing module to press the material.

4. The material processing method according to claim 1, wherein the heating module comprises a heating furnace; and heating the material by the heating module according to the preset heating parameter comprises:
   activating the heating furnace to heat the material in the heating furnace; and
   baking the material at a preset temperature for a first preset duration to acquire the heated material.

5. The material processing method according to claim 1, wherein the pressing module comprises a pressing cylinder, and pressing the material by the pressing module according to the preset pressing parameter comprises:
   activating the pressing cylinder to press the material by the pressing module by means of either lateral pressing or vertical pressing; and
   acquiring a molded material by performing mold closing for a second preset duration with a preset pressure value.

6. A molding machine, comprising a pressing module, a heating module, a material molding space, and an air supplying module, wherein
   the material molding space is configured to accommodate material;
   the heating module is configured to heat the material;
   the pressing module is configured to press the material; and
   the air supplying module is configured to continuously supply air to an air passage provided in the material during heating by the heating module and pressing by the pressing module.

7. The molding machine according to claim 6, wherein the air supplying module comprises an air source and at least one air supplying nozzle, the air source being connected to the at least one air supplying nozzle, and the at least one air supplying nozzle being paired with at least one air passage provided in the material.

8. The molding machine according to claim 7, further comprising a retractable component provided in correspondence with the air supplying nozzle, wherein the retractable component is configured to insert the air supplying nozzle into the corresponding air passage for air supplying when the material is placed inside the material molding space.

9. The molding machine according to claim 6, further comprising a fixing module that comprises a clamping component and a straightening component, wherein
   the clamping component is configured to clamp and fix the material placed in the material molding space; and the straightening component is configured to stretch the heated material vertically so that the material is in a straightened state.

10. The molding machine according to claim 9, wherein there are two fixing modules provided on upper and lower sides of the molding machine respectively.

11. The molding machine according to claim 6, wherein the pressing module comprises two paired pressing assemblies configured to move towards each other to press both sides of the material respectively.

12. The molding machine according to claim 11, wherein the pressing assembly comprises a hydraulic cylinder, a pressing member and a guide rod, and a mold component is attached to the pressing member, wherein the hydraulic cylinder is configured to convert hydraulic energy into mechanical energy for moving the pressing member; and the pressing member is configured to drive the mold component to move along the guide rod to perform mold opening or mold closing, based on the mechanical energy provided by the hydraulic cylinder.

13. The molding machine according to claim 11, further comprising a mold module that comprises two mold components, with one pressing assembly being provided on an outer side of each of the two mold components, wherein the two mold components are configured to mold the material according to a mold shape when the two pressing assemblies press the material respectively.

14. The molding machine according to claim 11, wherein the two pressing assemblies are provided on left and right sides of the molding machine respectively.

15. The molding machine according to claim 6, wherein the heating module comprises a sliding component and a heating component, wherein the sliding component is configured to drive the heating component to slide into the material molding space; and the heating component is configured to heat the material placed in the material molding space.

16. The molding machine according to claim 6, wherein a moving direction of the heating module is perpendicular to a moving direction of the pressing module.

* * * * *